US012565149B2

(12) United States Patent
Panigrahi et al.

(10) Patent No.: US 12,565,149 B2
(45) Date of Patent: Mar. 3, 2026

(54) PACKAGE DELIVERY USING DRONES INTEGRATED WITH VEHICLE ELEVATOR UNIT

(71) Applicant: Ford Global Technologies, LLC, Dearborn, MI (US)

(72) Inventors: Smruti Panigrahi, Novi, MI (US); Kurt Michael Lundeen, Novi, MI (US); Sam Hoff, Hazel Park, MI (US); Timothy Mark Feldkamp, Ann Arbor, MI (US); Yifan Chen, Ann Arbor, MI (US)

( * ) Notice: Subject to any disclaimer, the term of this patent is extended or adjusted under 35 U.S.C. 154(b) by 400 days.

(21) Appl. No.: 18/451,164

(22) Filed: Aug. 17, 2023

(65) Prior Publication Data

US 2025/0058714 A1      Feb. 20, 2025

(51) Int. Cl.
| | |
|---|---|
| *B60R 5/00* | (2006.01) |
| *B64U 70/93* | (2023.01) |
| *G06Q 10/0836* | (2023.01) |
| *B64U 101/64* | (2023.01) |

(52) U.S. Cl.
CPC .............. *B60R 5/003* (2013.01); *B64U 70/93* (2023.01); *G06Q 10/0836* (2013.01); *B64U 2101/64* (2023.01)

(58) Field of Classification Search
CPC .... G06Q 10/0836; B60R 5/003; B64U 70/93; B64U 70/7093; B64U 2101/64; B64U 2101/60; B60P 3/11
USPC ....................................................... 296/24.36
See application file for complete search history.

(56) References Cited

U.S. PATENT DOCUMENTS

| | | | |
|---|---|---|---|
| 9,915,956 B2 | 3/2018 | Bokeno et al. | |
| 10,207,820 B2 * | 2/2019 | Sullivan | B64F 3/00 |
| 10,730,626 B2 | 8/2020 | Gil et al. | |
| 10,789,567 B1 | 9/2020 | Ur | |
| 11,714,429 B2 * | 8/2023 | Ruth | G05D 1/692 |
| | | | 701/3 |
| 2016/0200438 A1 * | 7/2016 | Bokeno | B64C 39/024 |
| | | | 244/2 |
| 2018/0072416 A1 * | 3/2018 | Cantrell | B64U 10/13 |
| 2022/0101256 A1 | 3/2022 | Lee et al. | |

OTHER PUBLICATIONS

Tech Gistics, The Future of Last Mile Deliveries: Mercedes Vision Van Makes Logistics Look Cool, Sep. 28, 2016, pp. 1-6.

* cited by examiner

Primary Examiner — Amy R Weisberg
Assistant Examiner — Steven O Douglas
(74) *Attorney, Agent, or Firm* — Emily Campbell; Eversheds Sutherland (US) LLP

(57) ABSTRACT

A delivery vehicle is disclosed. The delivery vehicle may include a vehicle elevator unit configured to move a bin to a bin pickup zone in a vehicle interior portion. The delivery vehicle may further include a vehicle drone unit disposed on a top portion of the vehicle elevator unit. The vehicle drone unit may be removably coupled to the vehicle elevator unit. The vehicle drone unit may include a landing platform for a drone. The landing platform may include an opening to enable the drone to engage with the bin for a bin last-mile delivery. The opening may be in proximity to the bin pickup zone.

20 Claims, 12 Drawing Sheets

1100

Start — 1102

Obtain delivery information — 1104

Cause a vehicle elevator unit to move bin to pickup zone — 1106

Generate instructions to perform last-mile delivery — 1108

Transmit instructions to the drone — 1110

Stop — 1112

PACKAGE DELIVERY USING DRONES INTEGRATED WITH VEHICLE ELEVATOR UNIT

FIELD

The present disclosure relates to package delivery using drones and more particularly to package delivery using a drone unit integrated with a vehicle elevator unit.

BACKGROUND

E-commerce companies and their delivery partners deliver an ever-increasing number of packages per day, while trying to limit spend on resources (e.g., labor, etc.) and reduce delivery time. Various approaches are currently used to optimize the process of loading/unloading delivery packages to/from a delivery vehicle. For example, E-commerce companies load packages with similar delivery addresses in proximity to each other in a delivery vehicle to gain efficiency in unloading packages. Further, E-commerce companies optimize delivery routes for their delivery vehicles to reduce energy consumption and package delivery time.

While conventional methods performed by the E-commerce companies are effective in gaining efficiency, there remain challenges that cause inconvenience to vehicle drivers and/or the E-commerce companies. For example, unloading of delivery packages from a delivery vehicle for last-mile delivery is still a manual process and requires resources that may be unavailable or expensive.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
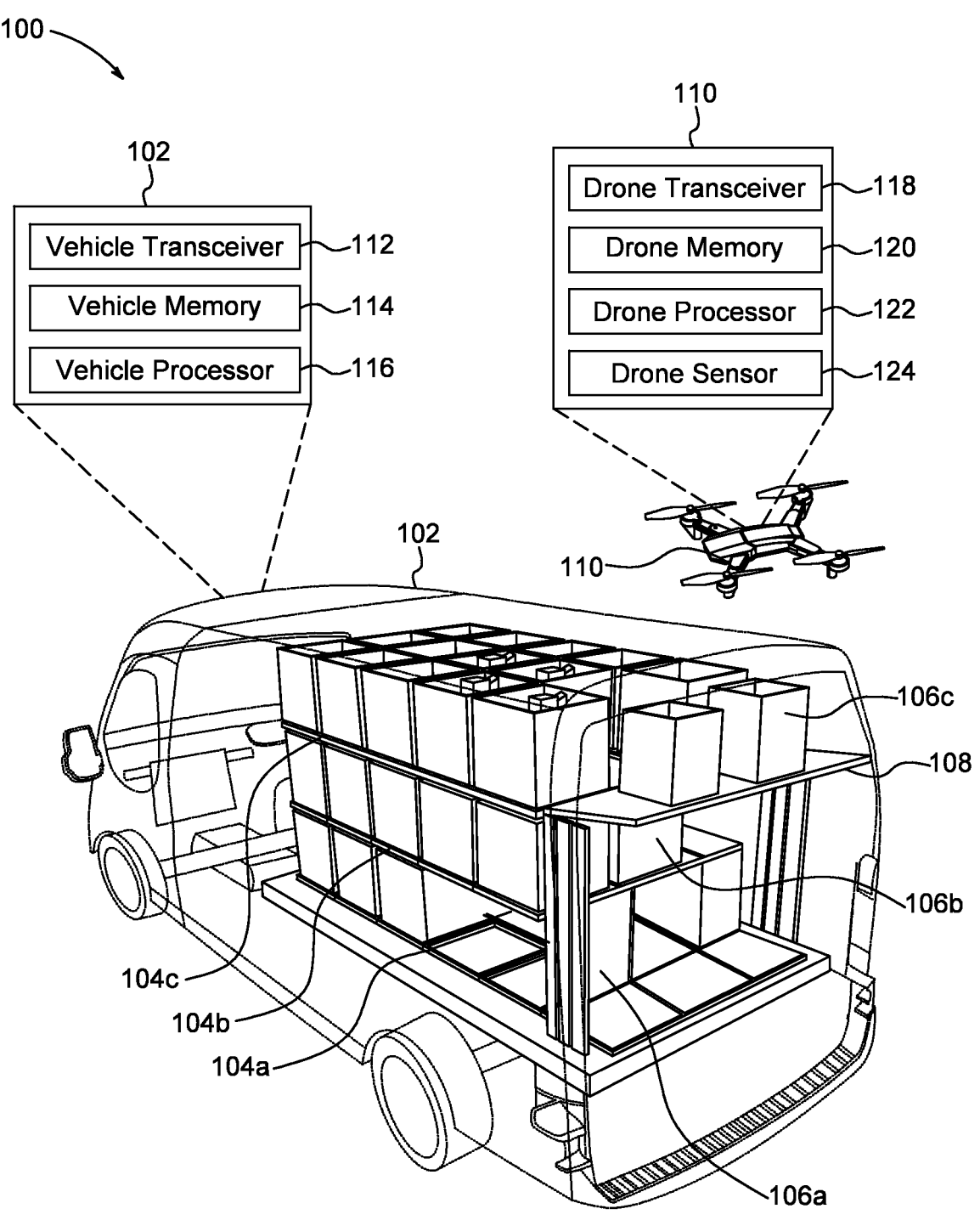
FIG. 1 depicts an example environment in which techniques and structures for providing the systems and methods disclosed herein may be implemented.

The present disclosure describes a delivery vehicle configured to perform bin (or package) delivery. The delivery vehicle may include a vehicle elevator unit configured to move a bin/package vertically along a vehicle height and dispose the bin/package to a pickup zone located in proximity to a vehicle top portion. The delivery vehicle may further include a vehicle drone unit that may be enclosed in the vehicle top portion (e.g., in a cut-out or recess in the vehicle top portion). The vehicle drone unit may enclose a drone configured to perform bin last-mile delivery. The vehicle drone unit may be disposed above the vehicle elevator unit and may be aligned with the vehicle elevator unit.

In some aspects, the vehicle drone unit may be connected with the vehicle elevator unit via a mechanical interface, a data interface, and a power interface. The mechanical interface may enable the vehicle drone unit to be directly plugged to a vehicle elevator unit top portion. The data interface may enable the delivery vehicle to provide delivery instructions to the drone (e.g., instructions to engage with bin and perform the bin last mile delivery). The power interface may enable the drone to receive power from a power source, e.g., from a vehicle battery.

In some aspect, the vehicle drone unit may include a vehicle landing platform for the drone. The landing platform may include an opening to enable the drone to engage with the bin for the bin last-mile delivery. The opening may be in proximity to the pickup zone, and the opening may be aligned with the pickup zone.

In additional aspects, the vehicle drone unit may include a sliding hatch at a vehicle drone unit top portion configured to cover/uncover the vehicle drone unit top portion. The drone may move out of the vehicle drone unit when the vehicle drone unit top portion may be uncovered. In addition, the vehicle drone unit may include a drone resting platform that may be configured to move up and down along a vehicle drone unit height to enable the drone to move in or out of the vehicle drone unit.

In some aspects, the bin may include cut-outs that may enable the drone to engage with the bin. For example, the drone may be equipped with a grasping mechanism to grasp or engage with the bin.

In further aspects, to facilitate drone-vehicle elevator unit alignment (e.g., to enable the drone to grasp the bin from the pickup zone in the vehicle elevator unit), the landing platform may include one or more recesses (e.g., conical recesses). The conical recesses may be configured to receive drone legs. In some aspects, the conical recesses may include a first magnetic material that may enable magnetic coupling between the landing platform and the drone which may have a second magnetic material. In further aspects, the landing platform may be of a shape that corresponds to a shape of a landing gear of the drone, which may enable the landing gear to snap into the landing platform to facilitate drone-vehicle elevator unit alignment.

The present disclosure discloses a delivery system and method that facilitates bin last-mile delivery using drones and the vehicle elevator unit, thereby increasing efficiency in delivering packages and reducing manual effort. The system further facilitates effective integration of the vehicle drone unit with the vehicle elevator unit to enable the drone to conveniently pick the bin/package and perform last-mile delivery.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a delivery vehicle 102 (or vehicle 102) that may be a truck, a van (including walk-in vans), a truck trailer, and/or the like. In some aspects, the vehicle 102 may be an autonomous vehicle. In other aspects, a driver (not shown) may operate the vehicle 102. Further, the vehicle 102 may include any powertrain such as, for example, a gasoline engine, one or more electrically-actuated motor(s), a hybrid system, etc.

The vehicle 102 may include one or more layers/arrays of a plurality of motorized tiles 104a, 104b, 104c (collectively referred as a plurality of motorized tiles 104) on which a plurality of bins 106a, 106b, 106c, etc. (collectively referred as a plurality of bins 106) may be secured. Each bin 106 may be configured to hold one or more packages. In an exemplary aspect, location of each bin 106 in the vehicle 102 and allocation of each package in each bin 106 may be optimally pre-planned or pre-set such that unloading of each package/bin from the vehicle 102 may be convenient (e.g., when the vehicle 102 reaches a package delivery location).

The environment 100 may further include a vehicle elevator 108 that may be disposed in a vehicle interior portion, in proximity to a vehicle rear portion. In an exemplary aspect, the vehicle elevator 108 may be disposed under a sliding top portion (not shown) of the vehicle 102. The vehicle elevator 108 may be configured to move a bin 106 (or a package) to a bin pickup zone (e.g., a first pickup zone) in the vehicle interior portion. Specifically, the vehicle elevator 108 may be configured to receive the bin 106 from one or more motorized tiles of the plurality of motorized tiles 104 and move the bin 106 along a vehicle height to place the bin 106 in the first pickup zone. The first pickup zone may be in proximity to a vehicle top portion. In further aspects, the vehicle elevator 108 may be configured to move the bin 106 (or any other bin) to a second bin pickup zone (e.g., in proximity to a vehicle cargo bed) for a vehicle operator to perform bin last-mile delivery, responsive to receiving the bin 106 from the motorized tiles. The second pickup zone may be in proximity to a vehicle bottom portion.

The environment 100 may further include a drone 110 that may be communicatively coupled with the vehicle 102 via one or more network(s). The drone 110 may be configured to receive the bin 106 from the first pickup zone and perform the bin last mile delivery (e.g., move the bin 106 from the first pickup zone to a delivery address associated with the bin 106).

The network(s) described above illustrates an example communication infrastructure in which the connected devices discussed in various embodiments of this disclosure may communicate. The network(s) may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may further include one or more units including, but not limited to, a vehicle transceiver 112, a vehicle memory 114 and a vehicle processor 116. The vehicle transceiver 112 may be configured to exchange information/data/signals with external devices or vehicle components (such as the drone 110). The vehicle memory 114 may store programs in code and/or store data for performing various operations in accordance with the present disclosure. Specifically, the vehicle processor 116 may be configured and/or programmed to execute computer-executable instructions stored in the vehicle memory 114 for performing various functions in accordance with the disclosure. Consequently, the vehicle memory 114 may be used for storing code and/or data code and/or data for performing operations in accordance with the present disclosure.

In some aspects, the vehicle processor 116 may be disposed in communication with one or more memory devices (e.g., the vehicle memory 114 and/or one or more external databases (not shown in FIG. 1)). The vehicle memory 114 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

The vehicle memory 114 may be one example of a non-transitory computer-readable storage medium or memory and may be used to store programs/instructions in code and/or to store data for performing various operations in accordance with the disclosure. The instructions in the vehicle memory 114 may include one or more separate programs, each of which may include an ordered listing of computer-executable instructions for implementing logical functions.

In some aspects, the vehicle memory 114 may store information associated with inventory loaded in the vehicle 102. The information (e.g., real-time information) associated with the inventory may include, for example, package size/dimension, package weight, packet shape, and/or the like associated with each delivery package in the vehicle 102. The information may further include bin size in which the packages/items may be placed, a mapping of the plurality of packages with the plurality of bins 106 (e.g., which package is placed in which bin), and/or the like. In addition, the vehicle memory 114 may include delivery information. The delivery information may include delivery location, delivery route, sequence of package delivery, date and time for the delivery, customer information (such as contact details, delivery address, etc.), and/or the like.

The vehicle processor 116 may obtain information from the vehicle memory 114, including the inventory information and the delivery information. Responsive to obtaining the information, the vehicle processor 116 may determine a bin 106 (e.g., the bin 106 or a package disposed in the bin 106) that may be scheduled for delivery at the next delivery location in the delivery route based on the obtained information. In some aspects, in the case of a bin last-mile delivery, the bin may only include orders/items associated with one delivery location/address.

Responsive to determining the bin 106, the vehicle processor 116 may cause the bin 106 to move from its storage location on the plurality of motorized tiles 104 (determined based on the inventory information obtained from the vehicle memory 114) to the vehicle elevator 108 via one or more motorized tiles. When the bin 106 may be placed on the vehicle elevator 108, the vehicle processor 116 may cause the vehicle elevator 108 to move the bin 106 to the first pickup zone. Specifically, the vehicle processor 116 may generate instructions for the vehicle elevator 108 to move the bin 106 to the first pickup zone and transmit the instructions to the vehicle elevator 108. The vehicle elevator 108 may receive the instructions from the vehicle processor 116 and may move the bin 106 to the first pickup zone based on the received instructions.

In some aspects, the vehicle processor 116 may be further configured to determine that the bin 106 may be placed in the first pickup zone (e.g., via vehicle sensors, vehicle cameras, and/or the like). Responsive to a determination that the bin 106 may be placed in the first pickup zone, the vehicle processor 116 may be configured to generate instruction(s) for the drone 110 to perform bin last-mile delivery and transmit the instruction(s) to the drone 110. In some aspects, the instructions may include delivery information that may include delivery or destination location associated with the bin 106. The drone 110 may receive the instructions and may engage with the bin 106 to move the bin 106 to the delivery/destination location.

In some aspects, the drone 110 may include one or more units including, but not limited to, a drone transceiver 118, a drone memory 120, a drone processor 122, and a drone sensor 124. The drone transceiver 118 may be configured to exchange information, data, notification, signals, etc. with the vehicle transceiver 112. For example, the drone transceiver 118 may be configured to receive the instruction to perform the bin last-mile delivery and may store the received instructions in the drone memory 120. The drone processor 122 may be configured to obtain the instructions from the drone transceiver 118 and/or the drone memory 120 and may cause the drone 110 to perform the bin last-mile delivery based on the obtained instructions.

As an example, responsive to receiving the instructions, the drone 110 may first engage with the bin 106 at the first pickup zone and then fly to deliver the bin 106 to the delivery/destination location. When the drone 110 completes the bin delivery, the drone 110 may return to the vehicle 102 for next bin delivery, and then the process described above may be repeated. In some aspects, the structure/features/functionality of the drone memory 120 and the drone processor 122 may be same as the structure/features/functionality of the vehicle memory 114 and the vehicle processor 116, respectively. In some aspects, the drone 110 may further include the sensor(s) 124 configured to facilitate drone operation. For example, the sensor(s) 124 may include proximity sensors to determine whether the bin 106 is disposed in the first pickup zone. In addition, the sensor(s) 124 may include pressure sensors to confirm drone landing.

The drone 110 may either be autonomous or may be operated remotely via an operator or a server. In case of autonomous remote navigation and operation, the drone 110 may maintain communication with the vehicle 102 either through vision system (e.g., being in line of sight) or through the network(s) described above. Further, although the present disclosure describes use of one drone (e.g., the drone 110) to enable bin last-mile delivery from the vehicle 102, the present disclosure is not limited to usage of a single drone. In other aspects, the vehicle 102 may use a plurality of drones to perform multiple deliveries simultaneously to enhance unloading or operational efficiency.

In further aspects, the vehicle processor 116 may cause the vehicle elevator 108 to move another bin to the second pickup zone (e.g., in proximity to the vehicle cargo bed). Responsive to moving the other bin to the second pickup zone, the vehicle processor 116 may transmit an instruction/notification to a user device associated with the vehicle operator or to a vehicle infotainment system (not shown) to perform the bin last-mile delivery. Thus, the vehicle processor 116 may enable bin last-mile delivery via the drone 110 as well as the vehicle operator per delivery location stop.

The vehicle 102, the vehicle operator and the drone 110 implement and/or perform operations, as described here in the present disclosure, in accordance with the owner manual and safety guidelines.

Figure 2:
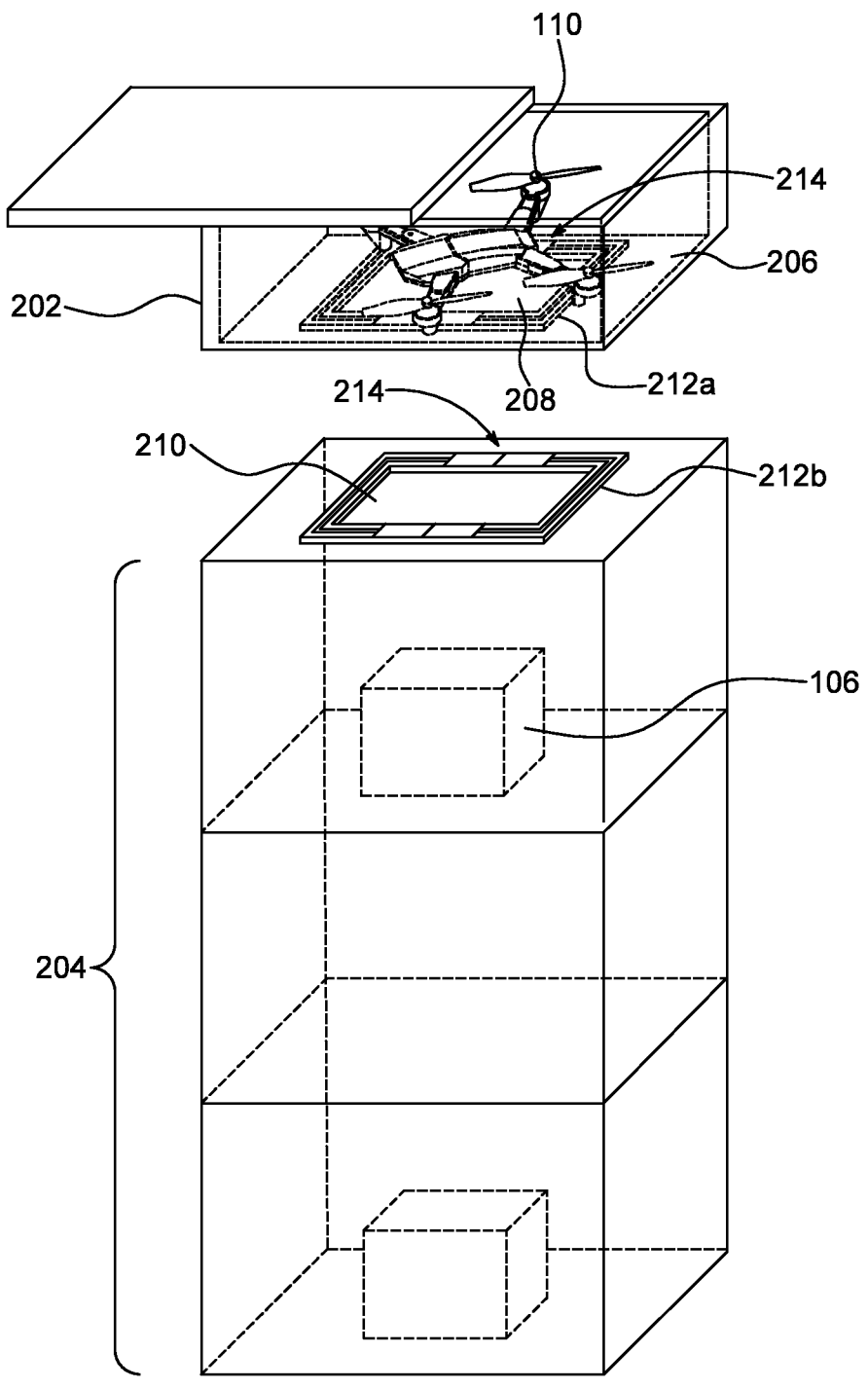
FIG. 2 depicts an example vehicle drone unit and vehicle elevator unit in accordance with the present disclosure.

FIG. 2 depicts a vehicle drone unit 202 and a vehicle elevator unit 204 in accordance with the present disclosure. The vehicle elevator unit 204 may be same as the vehicle elevator 108, or be a portion of the vehicle elevator 108 described above in conjunction with FIG. 1. As described above, the vehicle elevator unit 204 may be configured to move a bin (e.g., the bin 106) to the first pickup zone in the vehicle interior portion.

The vehicle drone unit 202 may be disposed on a vehicle top portion. In some aspects, the vehicle top portion may include a cut-out or recess configured to receive/enclose the vehicle drone unit 202. The vehicle drone unit 202 may be configured to enclose the drone 110 inside the vehicle 102. In some aspects, the vehicle drone unit 202 may include a landing platform 206 for the drone 110. The landing platform 206 may include an opening 208 (e.g., a first opening 208) to enable the drone 110 to engage with the bin 106 for the bin last-mile delivery. When the vehicle drone unit 202 may be attached to the vehicle top portion, the first opening 208 may be in proximity to the first pickup zone and may be aligned with the first pickup zone.

In some aspects, the vehicle drone unit 202 may be disposed on a top portion of the vehicle elevator unit 204, as depicted in FIG. 2. The vehicle drone unit 202 may be aligned with the vehicle elevator unit 204 to enable the drone 110 to perform the bin last-mile delivery. In some aspects, the vehicle elevator unit 204 may include an opening 210 (e.g., a second opening 210) at a vehicle elevator unit top portion, which may be aligned with the first opening 208 to enable the drone 110 to pick the bin/package from the first pickup zone.

The vehicle drone unit 202 may be attached to the vehicle elevator unit 204. In some aspects, the vehicle drone unit 202 may be removably attached with the vehicle elevator unit 204 via a first mechanical attachment interface 212a and a second mechanical attachment interface 212b (collectively referred as a mechanical interface 212). The vehicle drone unit 202 (e.g., a vehicle drone unit bottom portion) may be plugged (or slid) into a vehicle elevator unit top portion via the mechanical interface 212. In some aspects, the first mechanical structure 212a may be disposed on the vehicle drone unit bottom portion and the second mechanical structure 212b may be disposed on the vehicle elevator unit top portion. The first mechanical structure 212a may be configured to engage with the second mechanical structure 212b to couple the vehicle drone unit 202 with the vehicle elevator unit 204.

In additional aspects, the vehicle drone unit 202 may be coupled with the vehicle elevator unit 204 via a data and power interface 214. In some aspects, the data and power interface 214 may be disposed on the first mechanical structure 212*a* and the second mechanical structure 212*b*. In some aspects, the drone 110 (e.g., the drone transceiver 118) may be configured to exchange information with the vehicle 102 (e.g., the vehicle transceiver 112) via the data interface. For example, the vehicle transceiver 112 may be configured to transmit delivery information (such as delivery location) associated with the bin and/or the instructions to the drone 110 (e.g., the drone transceiver 118) via the data interface. In addition, the drone 110 may be configured to receive power from a power source via the power interface. For example, the drone 110 may receive power from the vehicle 102 (e.g., vehicle batteries) or an external power source via the power interface. In this manner, the drone 110 may be charged via the power interface when the drone 110 may be located in the vehicle drone unit 202. Stated another way, the drone 110 may charge when the drone 110 may be in resting or idle position in the vehicle drone unit 202. In further aspects, the drone 110 may have built-in small rapid re-chargeable battery to reduce drone weight. The drone 110 may be charged in between delivery runs.

Figure 3:
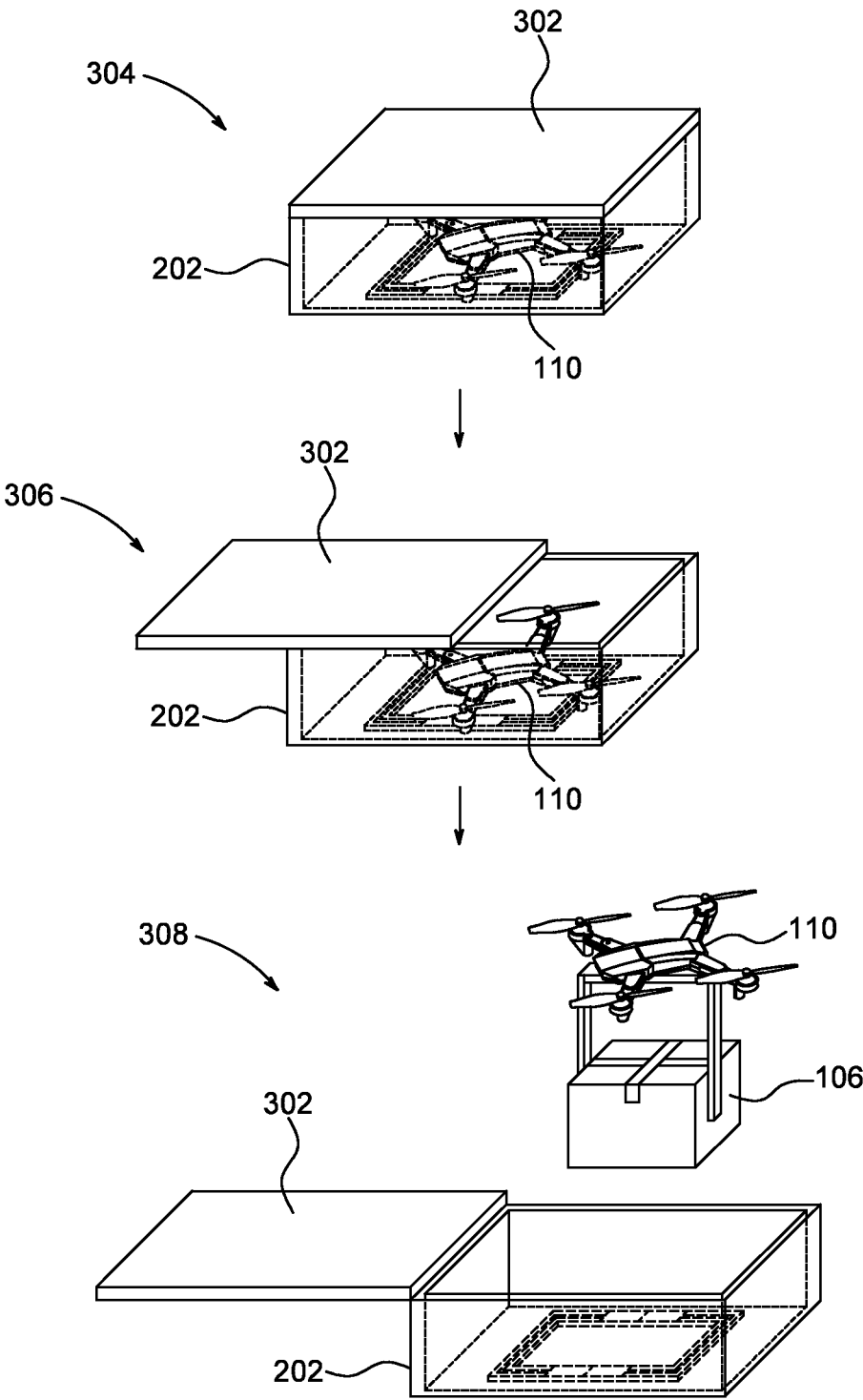
FIG. 3 depicts an example sliding hatch associated with the vehicle drone unit of FIG. 2 in accordance with the present disclosure.

FIG. 3 depicts an example sliding hatch 302 associated with the vehicle drone unit 202 in accordance with the present disclosure. The sliding hatch 302 may be disposed at the vehicle drone unit top portion. The sliding hatch 302 may be configured to slide and open/close the vehicle drone unit top portion. In some aspects, the sliding hatch 302 may be configured to cover (e.g., in a closed position) the drone unit top portion to protect the drone 110, for example, from ambient environment. The sliding hatch 302 may slide and may move in an open position to expose the drone 110 (or the vehicle drone unit 202) to enable the drone 110 to lift vertically upwards and perform the bin last-mile delivery. In addition, the sliding hatch 302 may move in the open position to enable the drone 110 to land directly into the vehicle drone unit 202 (e.g., after delivery completion).

FIG. 3 depicts different example positions of the sliding hatch 302 in views 304, 306, and 308. In the view 304, the sliding hatch 302 is in the closed position. In this position, the sliding hatch 302 may completely cover the vehicle drone unit top portion and may not enable the drone 110 to move in or out of the vehicle drone unit 202. In the view 306, the sliding hatch 302 is partially open, and in the view 308 the sliding hatch 302 is completely open (i.e., the sliding hatch 302 is in the open position in the view 308). When the sliding hatch 302 may be in the open position, the drone 110 may be enabled to move in or out of the vehicle drone unit 202.

In some aspects, the sliding hatch 302 may be configured to open or close based on the instructions/command signals transmitted by the vehicle processor 116 or user inputs. In further aspects, the sliding hatch 302 may enable the drone 110 (e.g., a drone vision system) to identify a landing zone in the vehicle interior portion. In some aspects, drone wings may remain in expanded state when the drone 110 may be resting in the vehicle drone unit 202 or when the drone 110 may be in flight mode.

Figure 4:
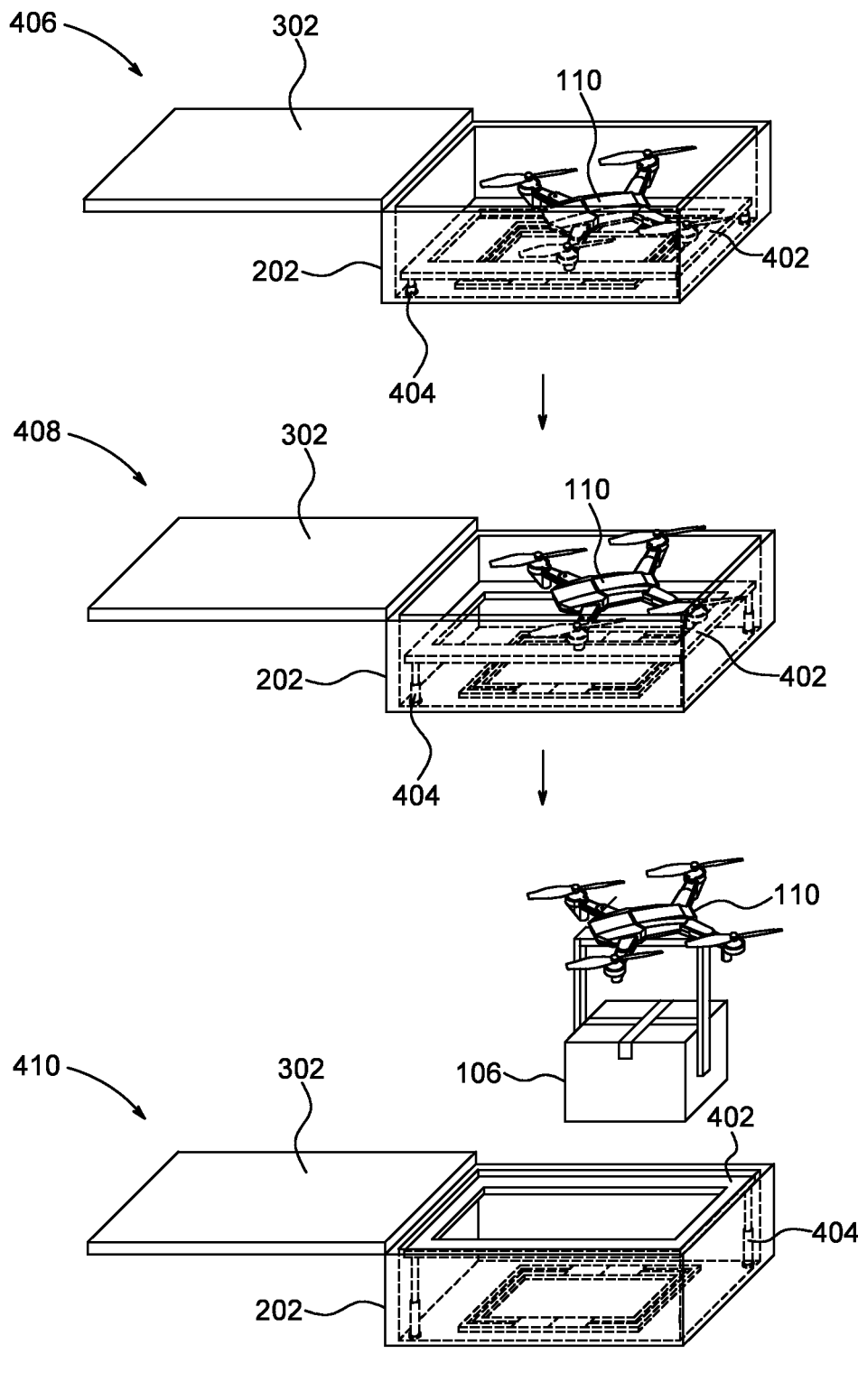
FIG. 4 depicts an example drone resting platform associated with the vehicle drone unit of FIG. 2 in accordance with the present disclosure.

FIG. 4 depicts an example drone resting platform 402 associated with the vehicle drone unit 202 in accordance with the present disclosure. The drone resting platform 402 may be disposed in a vehicle drone unit interior portion. The drone resting platform 402 may be configured to move vertically up and down along a vehicle drone unit height to enable drone movement in the vehicle drone unit 202. Stated another way, the drone resting platform 402 may be actuated up or down to lift the drone 110 up or down and move the drone 110 in or out of the vehicle drone unit 202. In some aspects, the drone resting platform 402 may include a telescopic/linear actuator 404 to move the drone resting platform 402 up or down in the vehicle drone unit 202. The telescopic/linear actuator 404 may include a plurality of telescopic legs (e.g., two legs on opposite sides). When the vehicle drone unit 202 may include the drone resting platform 402, the drone 110 may retract drone wings to be stowed away in a compact/narrow space.

FIG. 4 depicts different example views of the drone resting platform 402 in views 406, 408, and 410. In the view 406, the drone resting platform 402 may be in a lower/downward position. At this position, the drone wings may be in retracted position and may be in the vehicle drone unit 202. When the vehicle processor 116 generates the instruction for the drone 110 to perform the bin last-mile delivery, the drone processor 122 may obtain the instruction and may enable the drone 110 to grasp the bin 106 (or package) disposed in the first pickup zone. Responsive to the drone 110 grasping the bin 106, the drone resting platform 402 may start moving upwards (an intermediate position is shown in view 408), until the drone resting platform 402 moves to an upper/upward position as shown in the view 410. In this position, the drone 110 may be completely lifted out of the vehicle drone unit 202, and the drone wings may be in an expanded/unfolded position to perform the vertical lift (as shown in the view 410).

Figure 5:
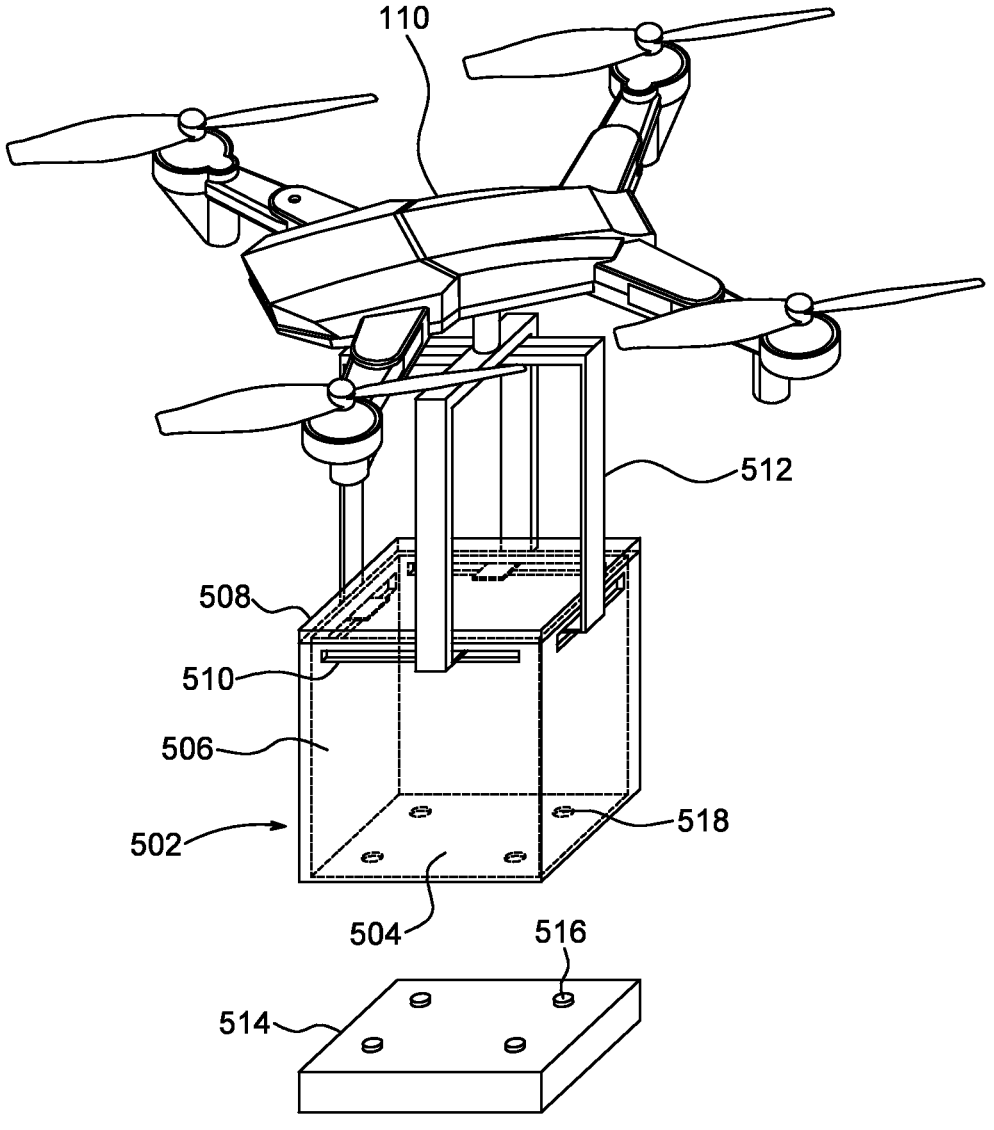
FIG. 5 depicts a first example bin grasping mechanism in accordance with the present disclosure.

FIG. 5 depicts a first example bin grasping mechanism in accordance with the present disclosure. The bin grasping mechanism may enable a drone (e.g., the drone 110) to engage with a bin 502 in accordance with the present disclosure. The bin 502 may be a hollow cube or cuboid and may include a bin bottom portion 504 and a plurality of bin sidewalls 506. In some aspects, the bin 502 may additionally include a cover 508 at a bin top portion. One or more bin sidewalls 506 may include a cut-out 510 on a bin sidewall top portion. In some aspects, the cut-outs 510 may be disposed at a portion (e.g., 50-80%) of a sidewall length. The cut-outs 510 may enable the drone 110 to engage with or grasp the bin 502 (e.g., via hooks 512 attached to the drone 110). In some aspects, the cut-outs 510 and the hooks 512 may form the bin grasping mechanism.

In some aspects, the bin 502 may be disposed on a base 514 that be disposed in the vehicle 102. The bin 502 may be detachably attached to the base 514. The base 514 may include locating pins 516, for example, at base corners. The locating pins 516 may be configured to engage with the bin bottom portion 504 (e.g., with locating holes 518 in the bin bottom portion 504) to prevent unwanted bin movement inside the vehicle 102 (e.g., due to vehicle movement). In further aspects, the base 514 may be an air-filled cushion (e.g., for drop protection). In additional aspects, the bin bottom portion 504 also may be air-filled cushion. The bin 502 may be made of a lightweight and disposable material (e.g., cardboard).

Figure 6A:
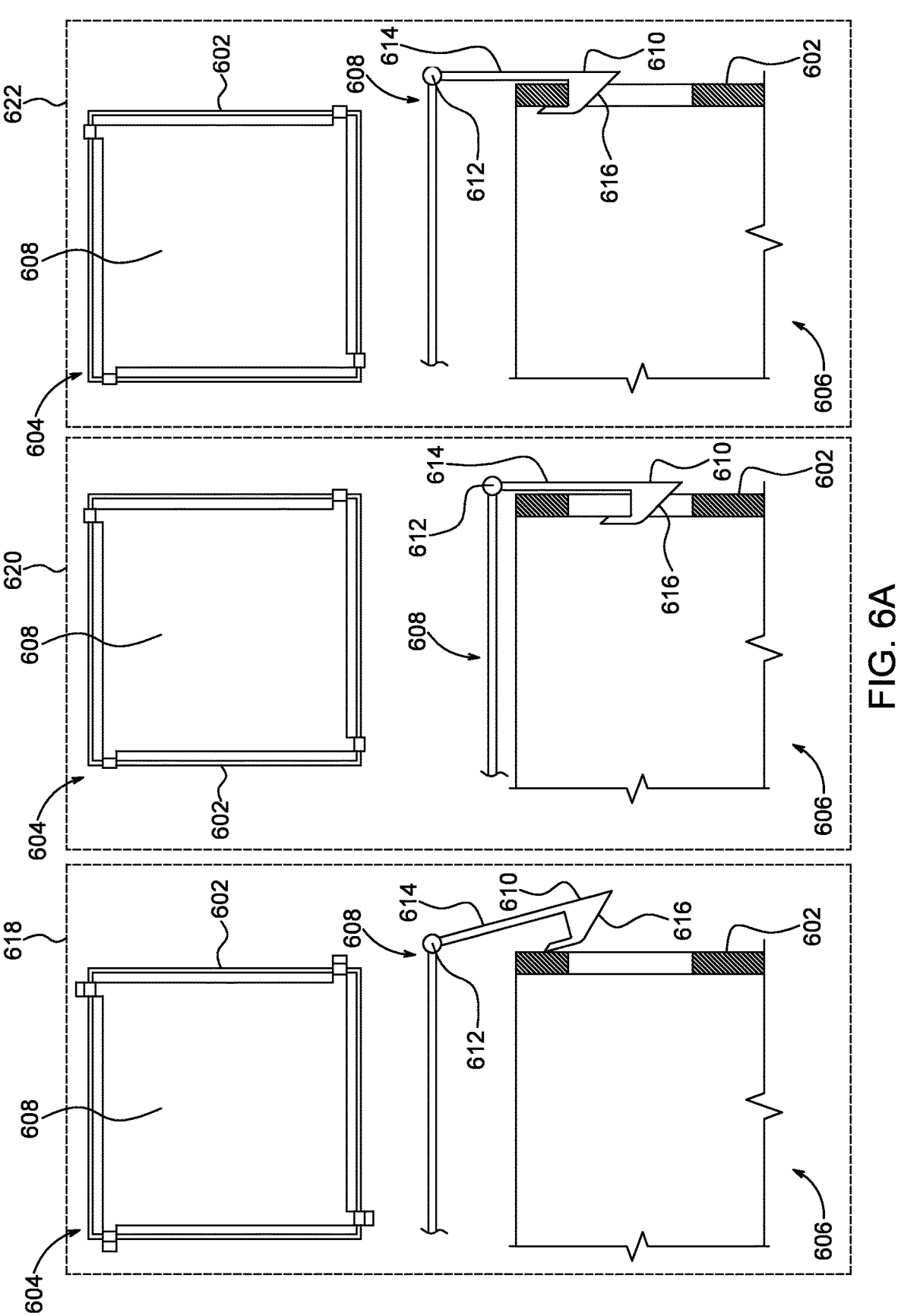
FIGS. 6A and 6B depict a second example bin grasping mechanism in accordance with the present disclosure.
Figure 6B:
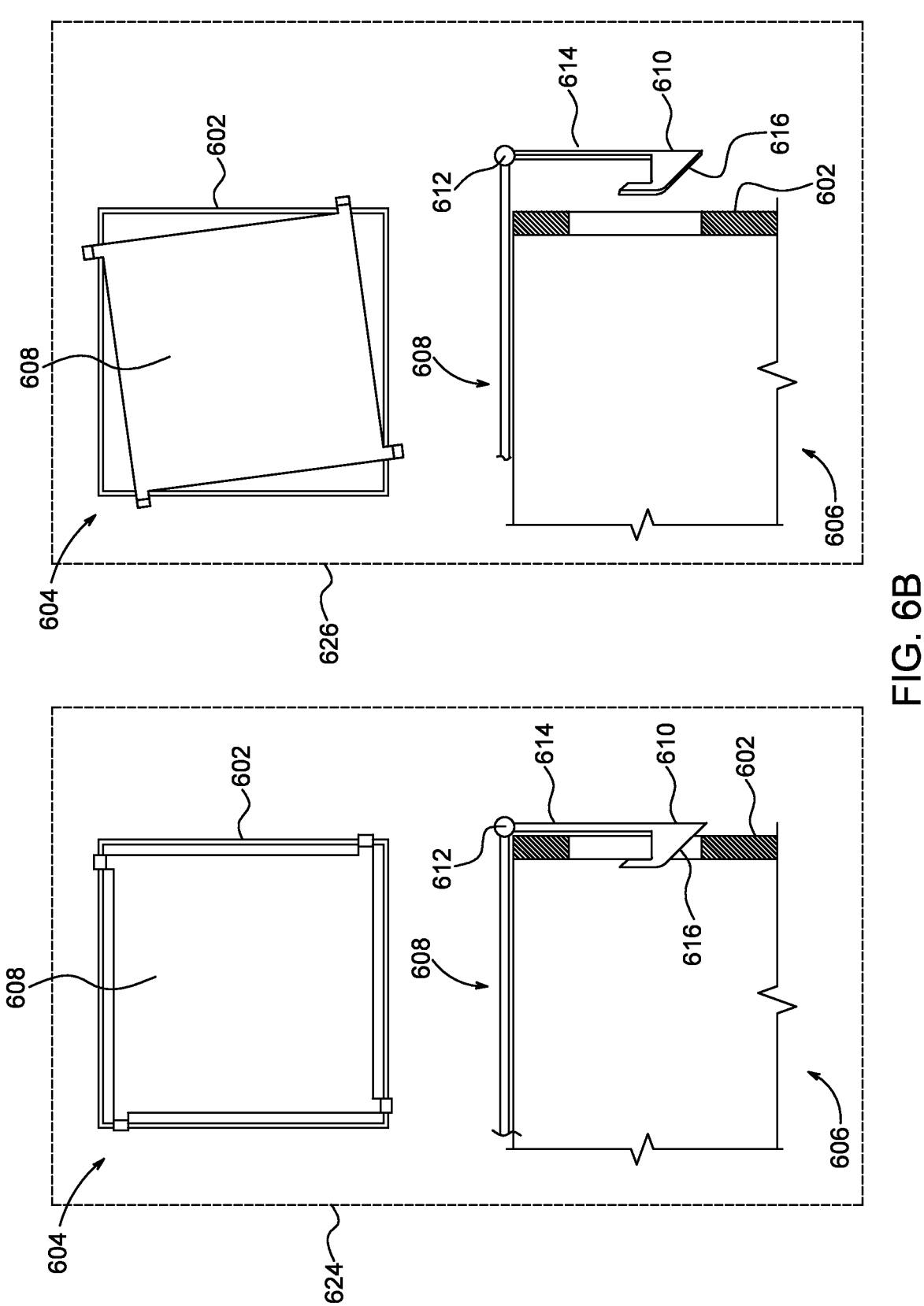

FIGS. 6A-6B depict a second example bin grasping mechanism in accordance with the present disclosure. The bin grasping mechanism may enable a drone (e.g., the drone 110) to engage with a bin 602 in accordance with the present disclosure. In some aspects, the bin 602 may include cut-outs in a bin top portion, as described above in conjunction with FIG. 5. The bin grasping mechanism may include a structural member 608 that may be attached to the drone 110 (e.g., a drone bottom portion). FIGS. 6A-6B specifically depict a top view 604 and a side view 606 of the bin 602 and the structural member 608 in different stages. The structural member 608 may be a plate that may be affixed to the drone bottom portion. The structural member 608 may be of any shape and size, which may correspond to bin/package shape and size. For example, the structural member 608 may be square in shape, when the bin 602 may be shaped as a cube.

In further aspects, the structural member 608 may include hooks 610 to engage with (or grasp) the bin 602 (e.g., bin cut-outs). The hooks 610 may be disposed eccentrically around structural member perimeter. For example, the hooks 610 may be disposed at structural member corners. In some aspects, the hooks 610 may be mounted on spring loaded hinges with mechanical stops 612, as shown in the side view 606 (of FIGS. 6A-6B), to engage the hooks 610 with the bin 602 (e.g., the bin cut-outs). Alternatively, the hooks 610 may include counterweights (not shown) to cause the hooks 610 to engage with the bin 602.

In some aspects, the hooks 610 may be located at ends of long slender members 614 of the structural member 608 that may be made of materials like plastic or thin spring steel. In further aspects, the hooks 610 may include beveled surface 616 on a hook bottom portion, which enables the hooks 610 to push outward when bought in contact with the top of the bin walls. The bin 602 may be brought to sufficient height for the hooks 610 to fully engage with the bin cut-outs.

In some aspects, to grasp the bin 602, the vehicle elevator unit 204 may move the bin 602 upwards until the bin 602 and the hooks 610 engage (e.g., until vertical alignment is achieved between the hooks 610 and cut-outs in the bin walls). When the bin 602 may be moving upwards, a bin sidewall may push the hooks 610 outwards (e.g., via the beveled surface 616 and using the spring loaded hinges with mechanical stops 612, as shown in stage 618 of the side view 606 in FIG. 6A). As the bin 602 continues to move upwards, the bin cut-outs in the bin sidewalls may align with the hooks 610. When the bin cut-outs may be aligned with the hook 610, the hooks 610 may move inwards (e.g., due to hook weight) and may move inside the bin cut-outs, as shown in stage 620 of the side view 606 in FIG. 6A.

The drone 110 may then activate all drone propellers in the same direction (e.g., counterclockwise), thereby causing the drone 110 to rotate in the opposite direction (e.g., clockwise) due to conservation of angular momentum. When the drone 110 rotates in the opposite direction, the hooks 610 may "lock" or engage with the bin cut-outs, as shown in stage 622 of the side view 606 in FIG. 6A. Responsive to the hooks 610 locking/engaging with the bin cut-outs, the drone 110 make take off vertically to perform the bin last-mile delivery.

To release the bin 602 from the hooks 610 (e.g., at the time of delivery), the drone 110 may start landing on a surface (e.g., ground). When the bin 602 may have landed on the surface and the drone 110 continues to move downwards, the bin cut-outs in the bin sidewalls may align with the hooks 610, as shown in stage 624 of the side view 606 in FIG. 6B. The drone 110 may then disengage the hooks 610 from the bin cut-outs by activating all propellers in the same direction (e.g., clockwise), thereby causing the drone 110 to rotate in the opposite direction (e.g., counterclockwise) due to conservation of angular momentum. The drone 110 thereby disengages the hooks 610 from the bin cut-outs, as shown in stage 626 of the top view 604 and the side view 606 in FIG. 6B. The drone 110 then takes off vertically until all components have cleared the bin top portion. The drone 110 may then fly laterally and return to the vehicle 102 (and repeat the process).

Figure 7:
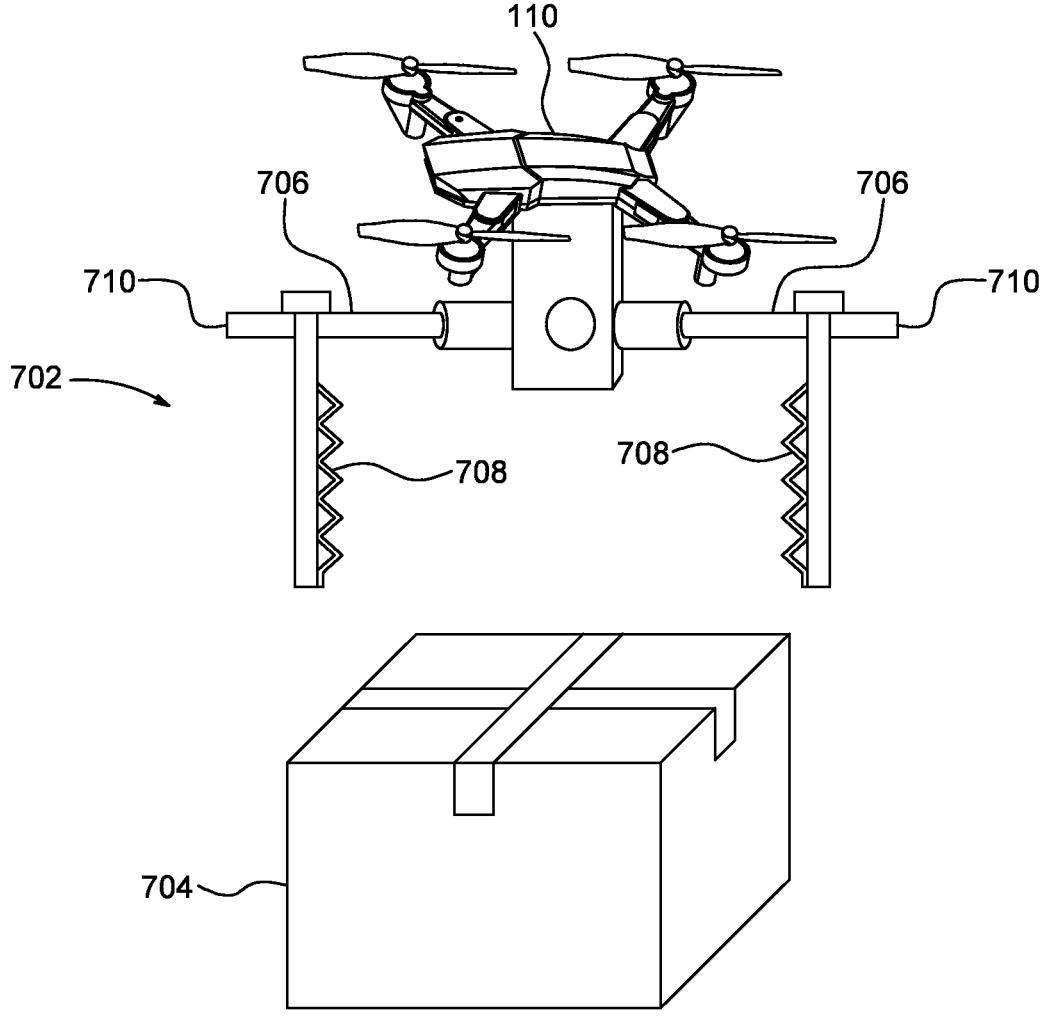
FIG. 7 depicts a third example bin grasping mechanism in accordance with the present disclosure.

FIG. 7 depicts a third example bin grasping mechanism 702 in accordance with the present disclosure. The bin grasping mechanism 702 may enable a drone (e.g., the drone 110) to engage with a package 704 (or bin). In some aspects, the drone 110 may couple (or may be equipped) with the bin grasping mechanism 702 (e.g., from the drone bottom portion). The bin grasping mechanism 702 may be attached to the drone bottom portion by using a mounting mechanism such as bolt-screw connector. The bin grasping mechanism 702 may be made of light-weight material to reduce overall drone weight, which may reduce drone power consumption.

The bin grasping mechanism 702 may include a telescopic arm 706 and a gripping structure/arms 708. The gripping arms 708 may be disposed perpendicular to the telescopic arm 706, and in an exemplary aspect, two gripping arms 708 may be disposed opposite to each other. In some aspects, the gripping arms 708 may be removably connected to the telescopic arm 706 and may be replaced when worn out. The gripping arms 708 may include gripping surfaces that may contact the walls of the package 704. In some aspects, the gripping surfaces may be made of light weight rubber padding for ease of grasping the package 704. In further aspects, the bin grasping mechanism 702 may include arm rest(s) 710 for drone landing pad. The arm rest(s) 710 may be disposed on two opposite sides of the telescopic arm 706. In some aspects, the drone processor 122 may control movement of the gripping arms 708 to enable grasping and disengaging of the package 704, when the drone 110 performs the package last-mile delivery.

Figure 8:
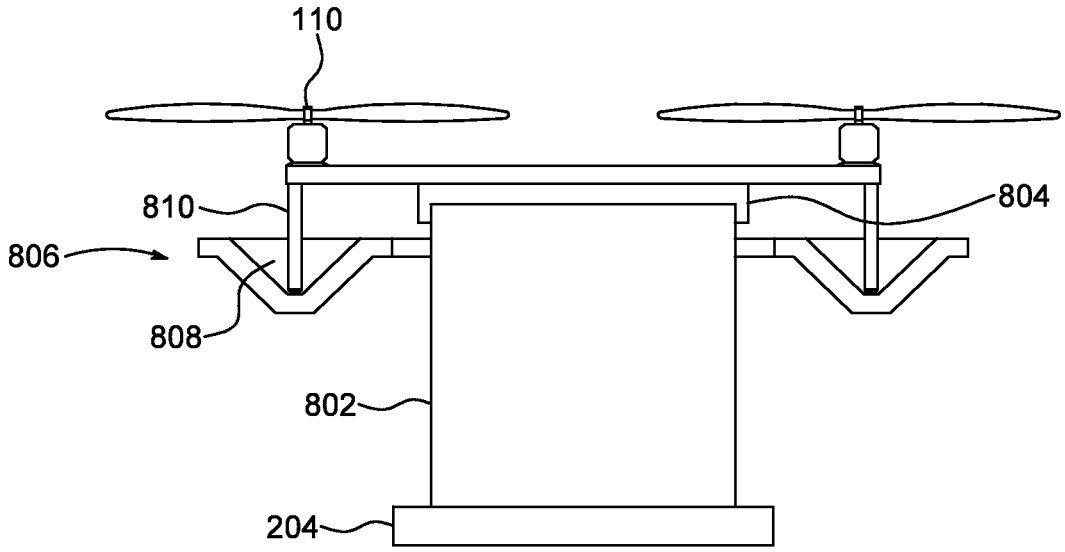
FIG. 8 depicts a first example drone-vehicle elevator unit alignment in accordance with the present disclosure.

FIG. 8 depicts a first example drone-vehicle elevator unit alignment in accordance with the present disclosure. As described above, the drone 110 may be aligned with the vehicle elevator unit 204 to enable the drone 110 to grasp a bin (e.g., the bin 106) to perform bin last-mile delivery. In some aspects, to align the drone 110 with the vehicle elevator unit 204, the vehicle drone unit 202 may include mechanical alignment features described below (in addition to drone sensing, planning and motion control schemes).

Specifically, FIG. 8 depicts the vehicle elevator unit 204 that may move a bin 802 to the bin pickup zone/first pickup zone (e.g., towards the vehicle drone unit 202 in which the drone 110 may be located). The drone 110 may be equipped with a package/bin gripper 804 configured to grasp the bin 802. The vehicle drone unit 202 may include a landing platform 806 on which the drone 110 may land. The landing platform 806 may include one or more recesses 808 (e.g., conical recesses) to receive/engage with drone legs 810. The recesses 808 may facilitate precise drone-vehicle elevator unit alignment.

In some aspects, the recesses 808 may include a first magnetic material (e.g., embedded magnets or electromagnets), which may interact with a second magnetic material (e.g., magnets or ferromagnetic materials) disposed in the drone legs 810. Thus, the landing platform 806 may be configured to be magnetically couple with the drone 110 via the first magnetic material and the second magnetic material. In some aspects, the first and second magnetic materials may provide enough attractive force to prevent unwanted drone motion yet not too much force to prevent the drone 110 from taking flight. In an exemplary aspect, if the recesses 808 include electromagnets, the retention force can be made large and then turned off just before drone takeoff.

Figure 9:
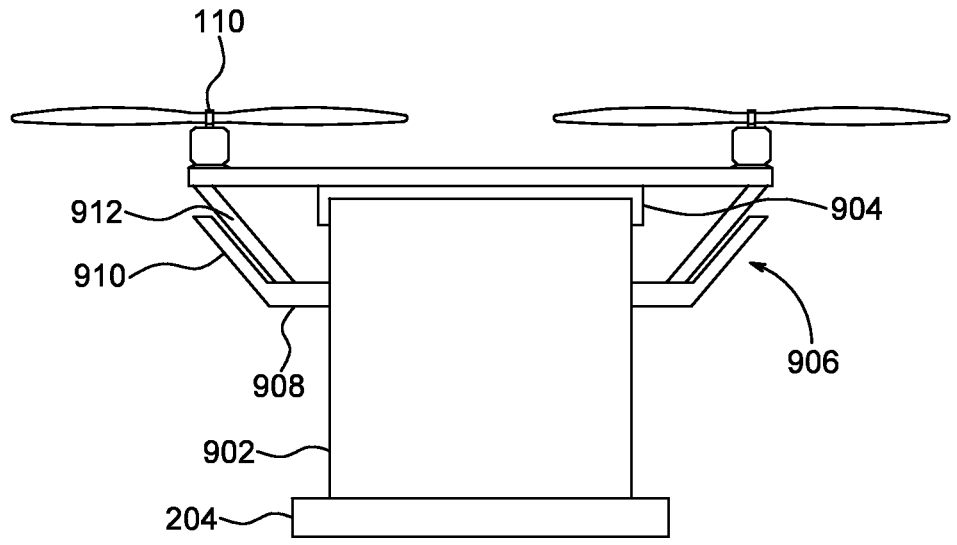
FIG. 9 depicts a second example drone-vehicle elevator unit alignment in accordance with the present disclosure.

FIG. 9 depicts a second example drone-vehicle elevator unit alignment in accordance with the present disclosure. Specifically, FIG. 9 depicts the vehicle elevator unit 204 that may move a bin 902 to the bin pickup zone (e.g., towards the vehicle drone unit 202 in which the drone 110 may be located). The drone 110 may be equipped with a package/bin gripper 904 configured to grasp the bin 902. The vehicle drone unit 202 may include a landing platform/pad 906 on which the drone 110 may land. The landing platform 906 may include a base 908 and sidewalls 910. The sidewalls 910 may be disposed at a predefined non-zero angle relative to the base 908. The landing platform 906 may be any size and shape and may be configured to receive landing gear 912 of the drone 110. The landing platform shape may correspond to the landing gear shape so that the landing platform 906 and the landing gear 912 may snap together, thereby enabling drone-vehicle elevator unit alignment. Stated another way, the landing platform 906 may be configured to be mechanically attach with the landing gear 912 to enable drone-vehicle elevator unit alignment.

Figure 10:
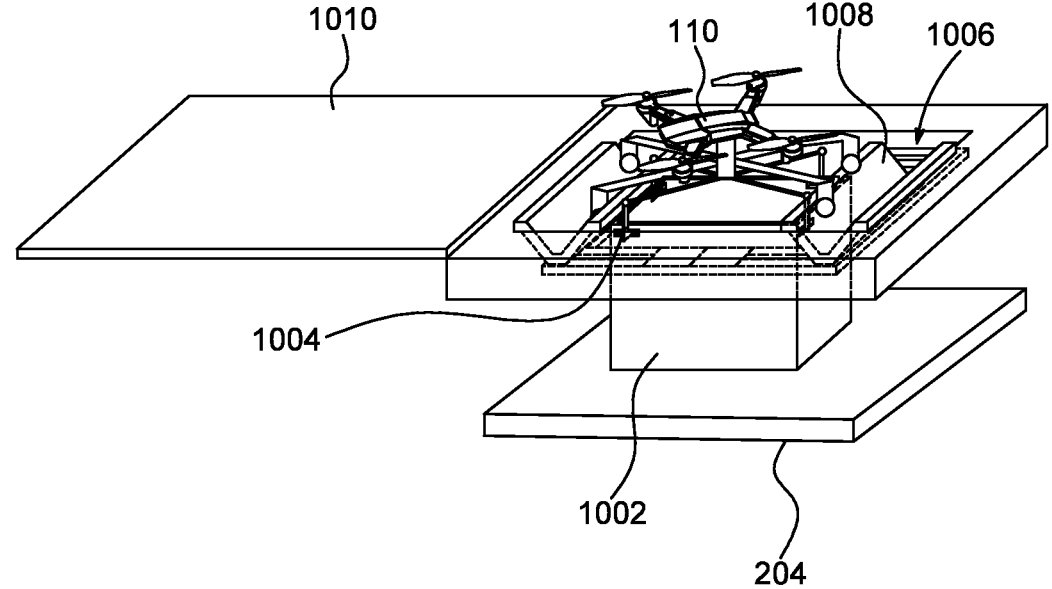
FIG. 10 depicts a third example drone-vehicle elevator unit alignment in accordance with the present disclosure.

FIG. 10 depicts a third example drone-vehicle elevator unit alignment in accordance with the present disclosure. Specifically, FIG. 10 depicts the vehicle elevator unit 204 that may move a bin 1002 to the bin pickup zone (e.g., towards the vehicle drone unit 202 in which the drone 110 may be located). The drone 110 may be equipped with a package/bin gripper 1004 configured to grasp the bin 1002. The vehicle drone unit 202 may include a landing platform/pad 1006 on which the drone 110 may land. The landing platform 1006 may include resting pads 1008 that may be disposed on two opposite end of landing platform top surface. The resting pads 1008 may be configured to receive the package/bin gripper 1004. The resting pads 1008 may include conical recess to receive a package gripper portion (e.g., gripper legs) to facilitate drone-vehicle elevator unit alignment. In some aspects, the vehicle drone unit 202 may include a sliding hatch 1010 described in FIG. 5.

Figure 11:
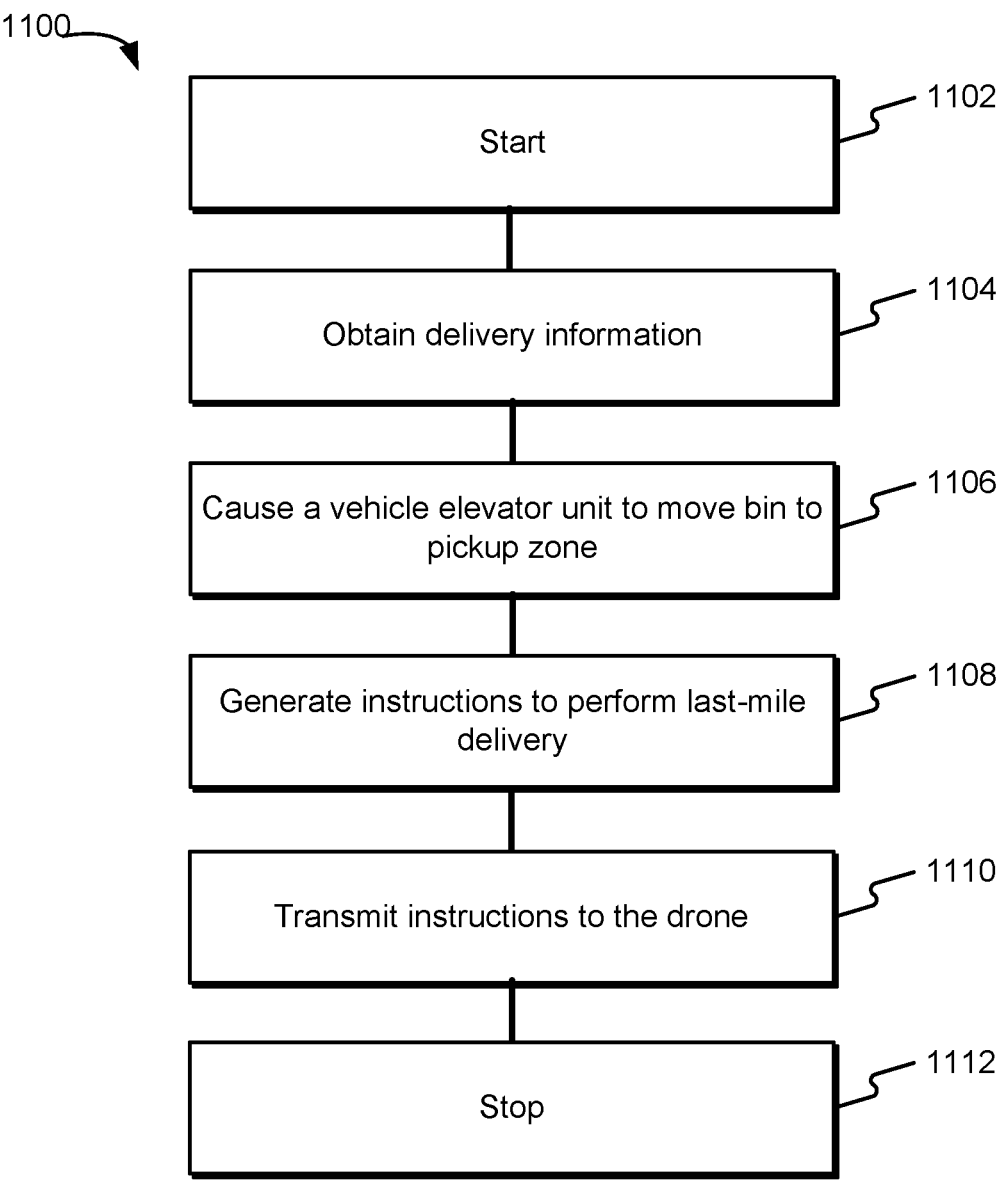
FIG. 11 depicts a flow diagram of an example method for facilitating bin/package delivery in accordance with the present disclosure.

FIG. 11 depicts a flow diagram of an example method for facilitating bin/package delivery in accordance with the present disclosure. FIG. 11 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 1100 starts at step 1102. At step 1104, the method 1100 may include obtaining, by the vehicle processor 116, delivery information associated with a bin (e.g., the bin 106). The delivery information may include a delivery location.

At step 1106, the method 1100 may include causing, by the vehicle processor 116, a vehicle elevator unit (e.g., the vehicle elevator unit 204) to move the bin 106 to a bin pickup zone in the vehicle interior portion responsive to obtaining the delivery information.

At step 1108, the method 1100 may include generating, by the vehicle processor 116, an instruction for the drone 110 to engage with the bin 106 in the bin pickup zone and perform the bin last-mile delivery. At step 1110, the method 1100 may include transmitting, by the vehicle processor 116, the generated instructions to the drone 110.

The method 1100 ends at step 1112.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:
a vehicle elevator unit configured to move a bin to a bin pickup zone in a vehicle interior portion; and
a vehicle drone unit disposed on a top portion of the vehicle elevator unit, wherein the vehicle drone unit comprises a landing platform for a drone, wherein the landing platform comprises an opening to enable the drone to engage with the bin for a bin last-mile delivery, and wherein the opening is in proximity to the bin pickup zone.

2. The vehicle of claim 1 further comprising a vehicle top portion having a cut-out, wherein the cut-out is configured to enclose the vehicle drone unit.

3. The vehicle of claim 1, wherein the vehicle drone unit is removably coupled with the vehicle elevator unit via a mechanical interface.

4. The vehicle of claim 1, wherein the vehicle drone unit is coupled with the vehicle elevator unit via a data interface, and wherein the vehicle is configured to transmit delivery information associated with the bin to the drone via the data interface.

5. The vehicle of claim 1, wherein the vehicle drone unit is coupled with the vehicle elevator unit via a power interface, and wherein the drone is configured to receive power from a power source via the power interface.

6. The vehicle of claim 1, wherein the vehicle drone unit comprises a sliding hatch at a top portion of the vehicle drone unit, and wherein the sliding hatch is configured to open or close the top portion of the vehicle drone unit to enable drone movement for the bin last-mile delivery.

7. The vehicle of claim 6, wherein the vehicle drone unit further comprises a drone resting platform in an interior portion of the vehicle drone unit, and wherein the drone resting platform is configured to move up and down along a vehicle drone unit height to enable drone movement in the vehicle drone unit.

8. The vehicle of claim 1, wherein the bin comprises a bin sidewall, wherein the bin sidewall comprises one or more cut-outs, and wherein the drone is configured to engage with the bin via the one or more cut-outs.

9. The vehicle of claim 1, wherein the landing platform comprises a recess configured to receive drone legs.

10. The vehicle of claim 9, wherein the recess comprises a first magnetic material and the drone legs comprises a second magnetic material, and wherein the landing platform is configured to be magnetically coupled with the drone via the first magnetic material and the second magnetic material.

11. The vehicle of claim 1, wherein a shape of the landing platform corresponds to a shape of a drone landing gear, and wherein the landing platform is configured to be mechanically attached with the drone landing gear.

12. The vehicle of claim 1 further comprising a processor configured to:

obtain a delivery information associated with the bin, wherein the delivery information comprises a delivery location; and
cause the vehicle elevator unit to move the bin to the bin pickup zone responsive to obtaining the delivery information.

13. The vehicle of claim 12, wherein the processor is further configured to:
determine that the bin is placed in the bin pickup zone;
generate an instruction for the drone to perform the bin last-mile delivery, responsive to a determination that the bin is placed in the bin pickup zone, wherein the instruction comprises the delivery information; and
transmit the instruction to the drone, wherein the drone is configured to receive the instruction and engage with the bin to perform the bin last-mile delivery responsive to receiving the instruction from the processor.

14. A method comprising:
obtaining, by a processor, a delivery information associated with a bin, wherein the delivery information comprises a delivery location;
causing, by the processor, a vehicle elevator unit of a vehicle to move the bin to a bin pickup zone in a vehicle interior portion responsive to obtaining the delivery information;
generating, by the processor, an instruction for a drone to engage with the bin in the bin pickup zone and perform a bin last-mile delivery, wherein the drone is disposed in a vehicle drone unit disposed on a top portion of the vehicle elevator unit, wherein the vehicle drone unit comprises a landing platform for the drone, and wherein the landing platform comprises an opening to enable the drone to engage with the bin for the bin last-mile delivery; and
transmitting, by the processor, the instruction to the drone, wherein the drone is configured to receive the instruction and engage with the bin to perform the bin last-mile delivery responsive to receiving the instruction.

15. The method of claim 14 further comprising:
determining that the bin is placed in the bin pickup zone; and
generating the instruction for the drone responsive to a determination that the bin is placed in the bin pickup zone.

16. The method of claim 14, wherein the vehicle drone unit is removably coupled with the vehicle elevator unit via a mechanical interface.

17. The method of claim 14, wherein the vehicle drone unit is coupled with the vehicle elevator unit via a data interface, and wherein the vehicle is configured to transmit delivery information associated with the bin to the drone via the data interface.

18. The method of claim 14, wherein the vehicle drone unit is coupled with the vehicle elevator unit via a power interface, and wherein the drone is configured to receive power from a power source via the power interface.

19. The method of claim 14, wherein the opening is in proximity to the bin pickup zone.

20. A non-transitory computer-readable storage medium having instructions stored thereupon which, when executed by a processor, cause the processor to:
obtain a delivery information associated with a bin, wherein the delivery information comprises a delivery location;
cause a vehicle elevator unit of a vehicle to move the bin to a bin pickup zone in a vehicle interior portion responsive to obtaining the delivery information;

generate an instruction for a drone to engage with the bin in the bin pickup zone and perform a bin last-mile delivery, wherein the drone is disposed in a vehicle drone unit disposed on a top portion of the vehicle elevator unit, wherein the vehicle drone unit comprises a landing platform for the drone, and wherein the landing platform comprises an opening to enable the drone to engage with the bin for the bin last-mile delivery; and transmit the instruction to the drone, wherein the drone is configured to receive the instruction and engage with the bin to perform the bin last-mile delivery.

\* \* \* \* \*